(12) United States Patent
Powlette

(10) Patent No.: US 9,213,587 B2
(45) Date of Patent: Dec. 15, 2015

(54) SYSTEM AND METHOD FOR PERMITTING A SOFTWARE ROUTINE HAVING RESTRICTED LOCAL ACCESS TO UTILIZE REMOTE RESOURCES TO GENERATE LOCALLY USABLE DATA STRUCTURE

(75) Inventor: Jody Francis Powlette, Centerville, OH (US)

(73) Assignee: Rateze Remote Mgmt. L.L.C., Wilmington, DE (US)

( * ) Notice: Subject to any disclaimer, the term of this patent is extended or adjusted under 35 U.S.C. 154(b) by 1027 days.

(21) Appl. No.: 13/217,663

(22) Filed: Aug. 25, 2011

(65) Prior Publication Data

US 2011/0314133 A1    Dec. 22, 2011

Related U.S. Application Data

(60) Division of application No. 11/359,720, filed on Feb. 22, 2006, which is a continuation of application No. 09/845,595, filed on Apr. 30, 2001, now Pat. No. 7,036,081, which is a division of application No. 09/172,191, filed on Oct. 13, 1998, now Pat. No. 6,489,954.

(51) Int. Cl.
   *G06F 3/0481*    (2013.01)
   *G06F 9/54*    (2006.01)
   *G06F 9/44*    (2006.01)
   (Continued)

(52) U.S. Cl.
   CPC ............... *G06F 9/54* (2013.01); *G06F 3/0481* (2013.01); *G06F 9/4443* (2013.01); *G06F 9/468* (2013.01); *H04L 67/02* (2013.01); *H04L 67/06* (2013.01); *H04L 67/34* (2013.01); *G06F 2209/541* (2013.01)

(58) Field of Classification Search
   CPC ... G06F 3/0481; G06F 9/4443; G06F 3/0867; H04L 67/06
   USPC ......... 715/740–749, 760, 734–737, 719–726, 715/208, 221, 239, 242, 255; 369/1; 707/640, 656
   See application file for complete search history.

(56) References Cited

U.S. PATENT DOCUMENTS 5,339,392 A    8/1994    Risberg et al.
5,727,161 A    3/1998    Purcell, Jr.
(Continued)

OTHER PUBLICATIONS

Kamin, et al., "An Introduction to Computer Science Using Java", McGraw-Hill Companies, inc. 1998, p. 345.
(Continued)

*Primary Examiner* — Steven Sax
(74) *Attorney, Agent, or Firm* — Brundidge & Stanger, P.C.

(57) ABSTRACT

A Java applet program loaded initially from a remote server is configured to receive additional user annotations for data displayed in an already opened applet window located at the user's client system. The user is permitted to preserve/capture, the modified applet window containing any such input or modifications to the applet window data. The updated applet window data cannot be written to the user's client system, instead, the modified window data is converted to a standard compressed graphics file format and then uploaded to the remote server. From there the applet can then open another applet window within a browser program pointing to the location of such file on the remote server. At that point, the user can then perform any desired operation on the file since the browser has access to the local system resources.

21 Claims, 3 Drawing Sheets

(51) Int. Cl.
*H04L 29/08* (2006.01)
*G06F 9/46* (2006.01)

(56) References Cited

U.S. PATENT DOCUMENTS

| | | | |
|---|---|---|---|
| 5,748,188 A | 5/1998 | Hu et al. | |
| 5,918,229 A | 6/1999 | Davis et al. | |
| 5,923,885 A | 7/1999 | Johnson et al. | |
| 5,948,066 A | 9/1999 | Whalen et al. | |
| 5,956,709 A | 9/1999 | Xue | |
| 5,963,215 A | 10/1999 | Rosenzweig | |
| 5,963,952 A | 10/1999 | Smith | |
| 5,974,441 A | 10/1999 | Rogers et al. | |
| 5,987,454 A * | 11/1999 | Hobbs | 1/1 |
| 5,991,306 A | 11/1999 | Burns et al. | |
| 5,996,006 A | 11/1999 | Speicher | |
| 6,006,217 A | 12/1999 | Lumsden | |
| 6,021,416 A | 2/2000 | Dauerer et al. | |
| 6,034,652 A * | 3/2000 | Freiberger et al. | 715/730 |
| 6,073,163 A | 6/2000 | Clark et al. | |
| 6,088,717 A * | 7/2000 | Reed et al. | 709/201 |
| 6,138,130 A * | 10/2000 | Adler et al. | 715/210 |
| 6,161,098 A | 12/2000 | Wallman | |
| 6,161,107 A | 12/2000 | Stern | |
| 6,178,432 B1 * | 1/2001 | Cook et al. | 715/201 |
| 6,185,306 B1 | 2/2001 | Mages et al. | |
| 6,230,171 B1 | 5/2001 | Pacifici et al. | |
| 6,243,865 B1 | 6/2001 | Wei et al. | |
| 6,256,628 B1 * | 7/2001 | Dobson et al. | 1/1 |
| 6,282,548 B1 * | 8/2001 | Burner et al. | 1/1 |
| 6,343,314 B1 | 1/2002 | Ludwig et al. | |
| 6,348,927 B1 * | 2/2002 | Lipkin | 345/619 |
| 6,363,398 B1 | 3/2002 | Andersen | |
| 6,405,224 B1 * | 6/2002 | Van Der Meer | 715/273 |
| 6,489,954 B1 | 12/2002 | Powlette | |
| 6,516,356 B1 | 2/2003 | Belknap et al. | |
| 6,662,236 B1 | 12/2003 | Chen et al. | |
| 7,036,081 B2 | 4/2006 | Powlette | |
| 2002/0049616 A1 | 4/2002 | Speicher | |
| 2003/0110124 A1 | 6/2003 | Escher | |

OTHER PUBLICATIONS

Webster's New World Dictionary of Computer Terms, 2000, pp. 114-436. Terms defined: "command" and "program".

* cited by examiner

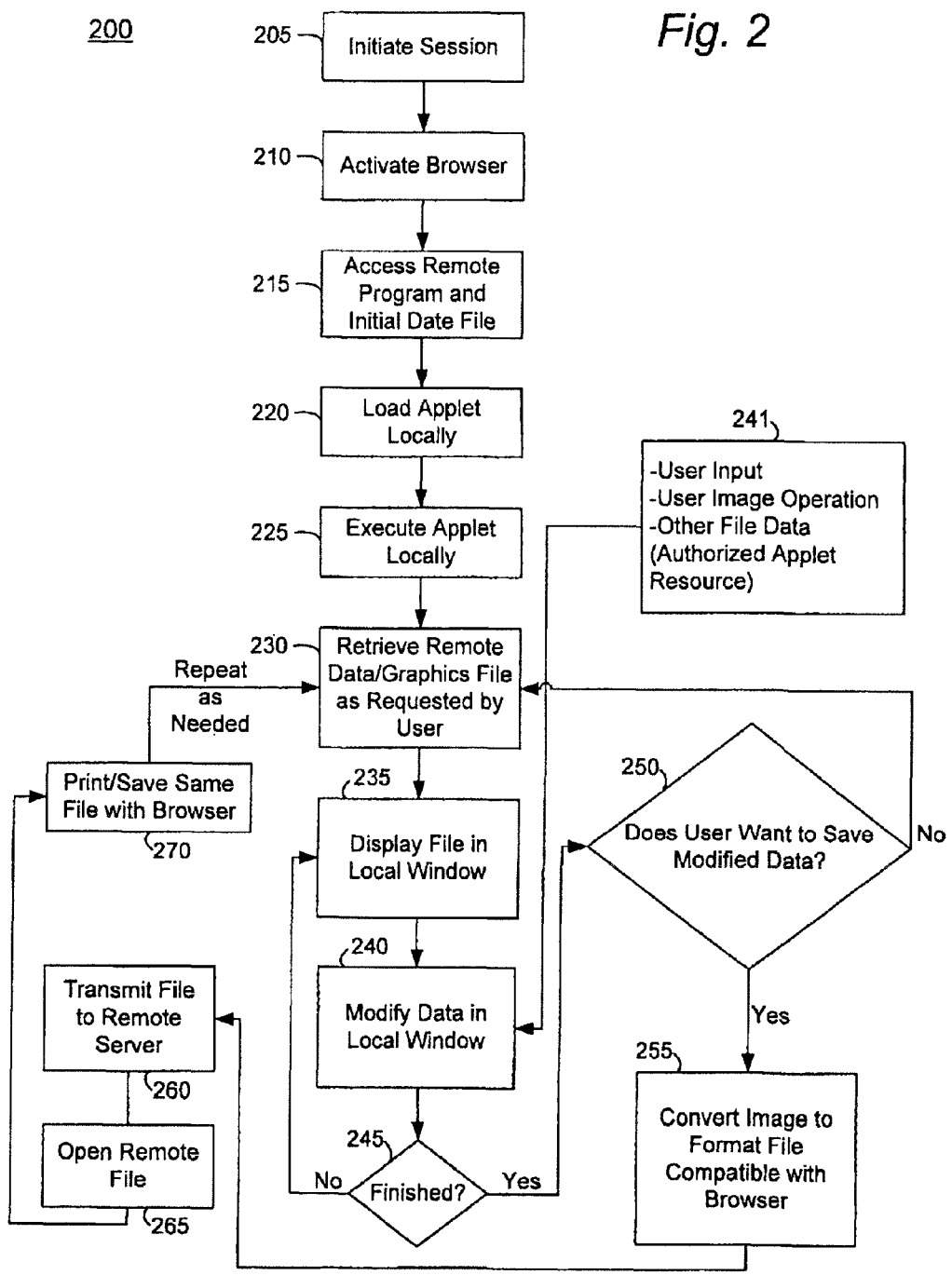

SYSTEM AND METHOD FOR PERMITTING A SOFTWARE ROUTINE HAVING RESTRICTED LOCAL ACCESS TO UTILIZE REMOTE RESOURCES TO GENERATE LOCALLY USABLE DATA STRUCTURE

CROSS REFERENCED TO RELATED APPLICATIONS

The present application is a Division of U.S. application Ser. No. 11/359,720 filed Feb. 22, 2006, now U.S. Pat. No. 8,255,805, the contents of which are hereby incorporated by reference into this application, which is a Continuation of U.S. application Ser. No. 09/845,595 filed Apr. 30, 2001, now U.S. Pat. No. 7,036,081, the contents of which are also hereby incorporated by reference into this application, which is a Division of U.S. application Ser. No. 09/172,191 filed on Oct. 13, 1998, now U.S. Pat. No. 6,489,954, the contents of which are also hereby incorporated by reference into this application.

FIELD OF INVENTION

The invention relates generally to a computer software routine which facilitates and expands the functionality of secure program routines running on a local client computing system by permitting such routines to interact with resources located at a remote server. The invention has particular use in increasing the utility of routines embodied in Java® applets, which, while running locally on a user's system, can nonetheless be configured to access resources from a remote server so as to circumvent security mechanisms otherwise prohibiting such applets from generating or reading local data structures.

COPYRIGHT NOTICE

A portion of the disclosure of this patent document contains material that is subject to copyright protection. The copyright owner has no objection to the xerographic reproduction by anyone of the patent document or the patent disclosure in exactly the form it appears in the Patent and Trademark Office patent file or records, but otherwise reserves all copyright rights whatsoever.

BACKGROUND OF THE INVENTION

The use of the world wide web (WWW) is increasing rapidly, and so of course is the demand for intelligent systems and software which can permit users to better and more easily explore its offerings. To access information on the WWW, a user typically utilizes a browser program having a graphical interface (such as those offered by such companies as Sun, Microsoft, and Netscape) to establish an electronic connection between his/her local client computing system, and a remote server system located at an ISP (Internet Service Provider). After such connection is made, the user can then perform a number of operations through the browser, including such tasks as uploading/downloading files (including text, graphics, audio, video, etc.) and even executing programs located on such remote server. The ability to locally execute programs retrieved from a remote ISP is in fact one of the greater attractions and promises of the WWW. By having a repository which is accessible to millions of users simultaneously, program authors have an opportunity to expand the distribution and use of their products to a level far beyond that previously attainable. To avoid cluttering the user's local computing system with extraneous program and associated support files, and more importantly so as to provide a measure of protection and security to such user, many of such programs are now being implemented using a language known in the art as Java®, and, in particular, using programming tools known as "applets." Java® applets are akin to Java® applications, but the former are specifically designed to interoperate with graphical user interfaces such as the conventional browsers mentioned above. Applets are extremely popular programs today also due to the fact that they provide program authors with the tools to create multi-media capable programs quickly and easily.

The ease of access to remote programs, however, also increases the possibility of potential security/privacy breaches at the user's local computing system. There is simply no practical method for a user to monitor the behavior of a remotely retrieved program to ensure that it is not improperly loading data to the user's system, or worse yet, capturing or altering private data from the user's local file system in his/her computing system. To address this concern, the authors of Java® intentionally constrained applets to operate in what is conventionally known as "sand box." In other words, applets were imbued with substantial functionality, but they are not permitted, for example, to do such things as read or write from file systems outside their own domain (usually the file system of the remote server). So, in the case of a remotely downloaded applet embodying some code which the user desires to execute, such applet cannot read or write to the users local file system. For a discussion of this limitation of applets, please see "An Introduction to Computer Science—Using Java" by Kamin et. al., McGraw-Hill, p. 345 (1998). Another limitation, of course, is the fact that an applet cannot make use of data structures (such as graphics file formats for example) that are incompatible or unreadable with the browser within which such applet is executing.

Heretofore this limitation on applets has not posed a substantial barrier to the use of applet based programs on the WWW, although some attempts have been made to ameliorate the effects of this restriction. For example, some program designers have tried to exploit loopholes in the sandbox to trick the user's operating system into permitting the applet to gain local access and print a file on a local printer. These programming patches, however, are undesirable because they are system specific, and are susceptible to being closed down by Java® developers/standards enforcers. Others have suggested relaxing the constraints on applets which are known by the user to come from a verified "clean" source. By requiring an applet to pass through a certification process, some measure of security can be maintained. Again, nonetheless, such "exemption" process is also vulnerable to attack from would-be security invaders, and is therefore unattractive to users seeking the maximum security intended to be offered by the applet environment. It is also inconvenient to users, because they must still perform the task of evaluating whether a particular program is worthy of certification. This, too, reduces the incentives for users to use the WWW, since it requires too much effort for the ordinary user to know what is safe and what is unsafe.

Despite the fact that such efforts have been limited in the past, applicant has realized that the need for a satisfactory solution to the applet limitation is more crucial now. The inability of an applet to print to a local printer, for example, means that a local user is unable to capture his/her local input and/or contributions to an applet program displaying a remotely retrieved file. This limits the users enjoyment of the program, since any contributions are lost once the browser program is closed. For example, a user who has used an applet in his/her browser and accessed a stock price chart located on a remote server, can make annotations, mark-ups, etc., and see such contributions on a display screen. They cannot, however, print a hard copy of such image, and again this reduces significantly the user's enjoyment and the utility of such program.

SUMMARY OF THE INVENTION

An object of the present invention, therefore, is to provide a system and method for permitting a local resource constrained software routine running on a local client system to circumvent such restrictions by exploiting resources at a remote server location;

Another object of the present invention is to provide a system and method for permitting a user of a locally executing client internet browser to manipulate and perform operations on files containing a mixture of local and remote server data;

A related object of the present invention is to provide a system and method for permitting a Java® applet to be able to emulate local file type functionality to a user while still complying with applicable security restrictions on such types of routines when running on a client machine;

Yet another object of the present invention is to provide a system and method for transferring data between a local computing system and a remote server so that file access privileges on the latter can be exploited by a program running on the former;

A further object of the present invention is to provide a system and method for permitting a user to engage in an interactive session during which they may modify content of data files from different remote sources, and still be able to capture and preserve such efforts in a local file system of the user's computing system;

Another object of the present invention is to provide a system and method for a remote server to engage a user to perform the above mentioned objectives.

A data capture program of the present invention is characterized generally by the fact that it is restricted from accessing a first local file system, but does have access rights to a second file system at a separate computing system. When program data is generated during an interactive on-line session that cannot be transferred to such local file system, the program instead transmits such program data from the local computing system to the second file system. The data capture program is further configured to interact with a browser on the local computing system, which browser has access rights to the local file system. In this manner, the browser program can then access the program data from the second file system, and transfer the program data to an output and/or storage device in the local computing system.

In a preferred embodiment, the program data is generally associated with modified file data resulting from modifications made by a user to initial data from an initial data file. These modifications could include additions, deletions, edits, etc., of any initial data file type preferably retrieved from the remote system, such as a file containing chart data, an audio file, a video file, a text file, etc. During the interactive session involving modifications to chart data, for example, any updates by the user are displayed dynamically in a first window on a display device for ease of use. Such modifications, because of restrictions on the environment in which such are created, cannot normally be saved to the users local file system. Therefore, when the user wishes to save the results of such modifications, the modified file data is transferred as noted above to the remote server, where it is treated as described. Thereafter, the modified file data as retrieved from the remote server can be displayed in a second window to such user where it can be manipulated as desired by the browser program operating on the users machine. In this manner, a user can preserve and capture the results of their efforts during such interactive session on a local computing system for future reference.

To transfer the modified file data from the local computing system to the remote server, an encoder is preferably used to compress the file data into a standard file format readable by the browser program. In the case of a visual image data, for example, the preferred approach is to convert such file into a GIF or JPEG formatted file.

The data capture program of the present invention is preferably implemented with one or more Java applets which are in the form of a remote program stored at a remote server. These applets are initially downloaded during the interactive session from the remote server but then execute on the user's local computing system within a restricted environment within the user's browser program. The remote program is preferably configured such that it interacts with the browser program and performs at least the following operations:
(1) retrieving an initial data file from the remote server for use during the interactive session; and
(2) displaying information relating to the initial data file in a display window visible to the user; and
(3) accepting modifications to such initial data file during the interactive session; and
(4) saving such modifications to such initial data file in an modified data file;
(5) routing the modified data file to the remote server; and In this fashion, the modified data file can be retrieved by the user at a later time and saved to the local file system by the browser program as noted above.

To further assist the user, the remote program also provides user command functions in the display window, which command functions can be used to generate the modifications more easily. As the modifications are made, the user is preferably given feedback to confirm the same (such as with a line drawn on a chart for example). The invention is also flexible in that more than one initial data file can be loaded from one or more remote servers and modified, thus permitting essentially unlimited editing capability.

A remote server of the present invention is configured to permit a user remote from such server to engage in an interactive on-line session with such server using the aforementioned remote program. In this way, the server can interact with the local machine as described above.

In a preferred embodiment of the remote program permitting a user to annotate chart data with visual labels and descriptions, an interactive portion of such program has a first executable routine for processing initial data from the initial data file obtained from the remote server and for storing first image data associated with the initial data in a window image data buffer. The browser program then causes the local computing system to display the first image data in a window on a display to the user. A second executable routine generates modified data based on the users modifying of the initial data with the visual labels and descriptions. A third routine then generates an modified data file based on the modified data, and then further transmits the modified data file to the remote server. Thereafter, the first routine, in cooperation with the browser, can also process the modified data file from the remote server, and thus the browser program can communicate the modified data file to a file system in the local computing system.

An interactive session between a local computing system and a remote server is therefore conducted in accordance with the present invention using the following preferred steps:

(a) accessing a remote program located on the remote server using a browser program located on the local computing system;

(b) executing the remote program on the local computing system;

(c) accessing an initial data file from the remote server with the remote program for use during the interactive session; and (d) displaying an initial display image based on initial data from the initial data file; and (e) modifying the initial data;

(f) saving the modified initial data as modified data; and (g) transmitting an modified data file corresponding to the modified data from the local computing system to the server; and (h) accessing the modified data file from the remote server with the remote program;

(i) communicating the modified data file to a file system in the local computing system using the browser program.

In the above described method, the modified data is derived from an initial data file (which may include more than one initial data file) and supplemental data input under control of a user of the remote program.

In a further variation, the updated data file is image data compressed using an encoder which translates a pixel stream into a file format usable by the browser program or another program having access to the local file system.

Data transfers of the present invention are accomplished through an on-line connection between a local computing system and a remote server preferably using the following steps:

(a) executing an interactive program on the local computing system, which interactive program coordinates with an on-line connection management program on such local computing system, and which interactive program further is restricted from accessing a local file system on such local computing system;

(b) accessing initial data information for use on the local computing system; and (c) generating modified data information, which modified data information includes the initial data information and any additional data supplemental information added under control of a user of the interactive program; and (d) saving the modified data information;

(e) transmitting the modified data information from the local computing system to the server; and (f) accessing the modified data information from the remote server;

(g) communicating the modified data information to an output and/or storage device in the local computing system using the on-line connection management program.

Again, in a preferred embodiment, the modified data is compressed image data derived from dynamically modifying an initial data file. This image data is compressed using an encoder which translates a pixel stream into a file format usable by the second program. Nonetheless, the initial data file can be in a graphics file format, an audio file format, a text format, a video format, or some combination thereof.

An interactive, on-line session of the present invention permitting a user to engage in an interactive on-line session with a server using a remote program downloaded from the server but executing on the users local computing system, and wherein the remote program is restricted from accessing a file system on such local computing system, is accomplished as follows:

(a) coordinating communications between the server and a browser program also executing on the user's local computing system during the interactive on-line session, the browser program further including software routines for interacting with the file system on the users local computing system; and (b) receiving data at the server consisting of modified information transmitted from the remote program;

(c) creating an modified file for the modified information at the server, which modified file is accessible by the remote program;

(d) transferring the modified file to the local computing system so that the browser program can utilize the modified file;

In this manner, the browser program can thereafter transfer such modified file to an output and/or storage device in the local computing system, such as a printer, a local file system, etc.

Although the inventions are described below in a preferred embodiment, it will be apparent to those skilled in the art the present invention would be beneficially used in many environments where it is necessary to provide security constrained software routines with additional functionality.

BRIEF DESCRIPTION OF THE DRAWINGS

FIG. 2 depicts in flow chart form the general method of operation of the system noted in FIG. 1.

DETAILED DESCRIPTION OF THE INVENTION

Figure 1:
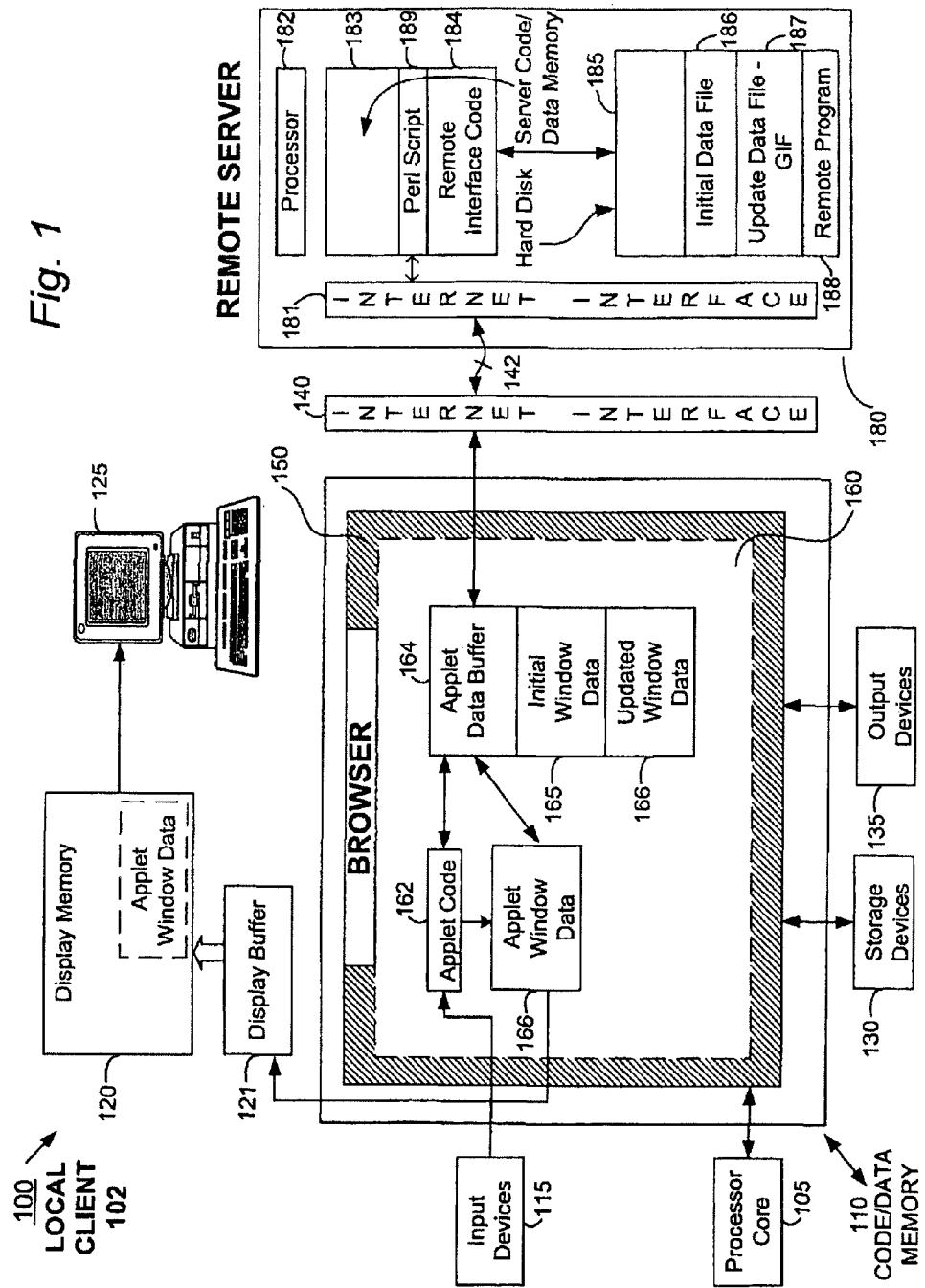
FIG. 1 is a block diagram illustrating an embodiment of a system implemented in accordance with the teachings of the present invention.

A preferred embodiment of a system 100 constructed in accordance with the present disclosure is shown in block diagram form in FIG. 1. A local client computing system 102 includes a number of components found in any typical contemporary computing system, including a processor 105 operable with a system code/data memory 110 (normally a DRAM), one or more input devices 115 (usually a keyboard, mouse, joystick or the like), a display memory 120 and associated buffer 121) (typically a supplemental fast VRAM or DRAM separate from system memory 110), a display 125 (preferably a CRT monitor, LCD panel etc.), one or more storage devices 130 (ordinarily a hard disk drive or other magnetic/optical based devices), an output device 135 (usually a printer) and an I/O interface 140 (preferably a high speed modem and associated drivers) for establishing an electronic connection 142 to the internet, an intranet, or other computer network. All of the aforementioned components are conventional, and it is understood that such computing system may range in complexity spanning the spectrum from a large multi-user mainframe down to personal electronic assistants.

Operating within code/data memory 110 under control of processor 105 is a browser program 150, and an applet 160 executing within such browser. This applet runs in a standard Java virtual machine (JVM) within the browser. This operational relationship is denoted by browser program 150 enclosing applet 160; it will be apparent to those skilled in the art that this visual representation is merely intended for illustrative purposes, and does not purport to describe the entirety of the relationship between the browser and the applet. Moreover, since this relationship is well-known in the art, see e.g., the Kamins reference discussed above, it is not necessary to replicate such details here. Browser program 150 (preferably one of the more robust versions known in the art, such as Netscape Navigator or Microsoft Explorer) is configured to operate within system memory 110, and is capable of interacting/communicating of course with the other components within system 102 in conventional fashion, as well as through internet link 142 with a remote server 180 located at an ISP site. Remote server 180 also includes many of the same components of system 102 (albeit in larger scale to accommodate the needs of several potential data requesters) such as an I/O interface 181, a processor 182, a server code/data memory 183, and a storage system 185. This system is used to store both an initial data file 186, and a modified data file 187, which items are discussed in more detail below.

Returning back to applet routine 160, it can be seen in FIG. 1 that this item includes applet code 162, which is written in Java® programming code; a listing of the source code used in the present invention is appended to the end of the present disclosure as Appendix A. This Java® code can be executed by means of a Java® interpreter in browser 150 to carry out operations within system 102. Applet code 162 has access to an applet data buffer 164, which, as shown in FIG. 1, is designed to store incoming/outgoing data through internet link 142. As seen in FIG. 1, initial window data 165, as well as updated window data 166 are located and stored within such applet data buffer 164. Finally, applet code 162 also has access to an associated applet window data buffer 167, which it can use for painting a window on display 125 as explained further below. This buffer can be generated with conventional Java® programming tools, including, for example, the createlmage ( ) command to any desired size for the applet and application in question. The relationship between the various applet routines and resources can be gleaned further from the source code listing attached hereto, which includes all of the routines discussed herein except for the freeware programs noted below.

With the exception of the above details pertaining to applet 160, the other circuitry, structures and routines embodied in the block diagram of FIG. 1 are not material to the teachings of the present invention. These items are well-known in the art, and can be implemented by skilled artisans in a variety of ways. Moreover, it will be apparent to those of skill in the art that a number of conventional (but extraneous in this case) features of client system 102 and server system 180 have been omitted to better illustrate the present teachings.

As FIG. 1 suggests, to maximize security and privacy for the user's local client computing system 102, applet 160 is operationally restricted and has only limited access to components within system 102. It cannot, for example, directly interact with a storage device 130, or an output device 135 in order to create (or read) a file within local client system 102. Nor can applet 160 operate to transfer a file directly to browser program 150. This is an undesirable situation, since, as mentioned above, it is likely that many users in the future will download files from remote servers, modify such files, and yet not be able to do anything useful with them afterwards. For example, they will not be able to save such modifications for use with other programs on the user's computing system. It will be understood by those skilled in the art that Java language applets are only one form of programming which may be subject to such restrictions, and that the present invention is by no means limited to such specific contexts.

To overcome this limitation, applet code 162 of the present invention includes instructions which permit the local client computing system 102 of FIG. 1 to carry out the method of the present invention as shown in flow chart form in FIG. 2. At step 205, a user initiates an online session from his/her local client computing system 102 in conventional fashion, such as by dial-up or always-on access to an ISP. Browser 150 is then activated at step 210 to permit the user to see, interact and access other programs, files, etc. at step 215; such items may be located on the internet, including at a WWW compatible remote server 180 through an http link or the like. When the user desires to interact with a remote program on remote server 180, one or more applets 160 necessary for operating such program will be transmitted downstream to the user's computing system 102 through link 142 at step 220 where they will be loaded into a code/data memory 110 for execution on local computing system 102 during step 225. In a preferred embodiment, the remote program accessed and loaded by the user is located at a website maintained by Prophet Information Services at www.prophetcharts.com. This program is known as "Prophet Charts," and generally includes such functionality as: (1) permitting a user to retrieve historical stock data from a file stored on a remote server; (2) placing such stock data in graphical form in a visible display window at the user's end; (3) permitting the user to annotate the chart with trend lines, labels, etc. to glean trading patterns, potential buy/sell opportunities, etc. Accordingly, in the event the user requests to see data associated with an initial remote data file 186 (FIG. 1)—as for example, in the case of a historical chart showing the price of a particular stock for a particular period of time this file is retrieved by applet code 162 at step 230. In this instance, as described above, applet 160 can access such data in file 186 because the latter is located logically in the same environment from which applets 160 are derived. To ensure that such data is usable by the user within system 102, file 186 must be retrieved from server 180 in a format that is readable or decodable by browser 150; i.e., in text form, or some graphics form that is acceptable, such as GIF, TIFF, JPEG, or the like, depending on the particular browser program 150.

In any event, initial data from file 186 is stored within Applet Data Buffer 164 at location 165 (as shown in FIG. 1) where it is processed by applet code 162 and then placed into Applet window data buffer 167. By coordinating with browser 150, a graphical representation of initial data file 186 is then passed through display buffer 121, where it then is placed in display memory 120 as noted in the dotted lines shown in FIG. 1. Subsequently, the applet window image data then also becomes visible to the user on display 125 as noted in step 235 of FIG. 2.

Up until this point, the above description has merely described the typical operation of any prior art Java® applet program loaded from a remote site onto a local client computing system. In the present embodiment, nonetheless, a number of additional unique operative steps are implemented to provide such program user with functionality not previously available.

Referring again to FIG. 2, the primary features, benefits, etc. of the present invention are based in large part on the operations carried out by applet code 162 beginning at step 240. At that point in the routine, the user is permitted to interact with the data presented in the applet window image on display 125. In particular, in a preferred embodiment, the user is allowed to add annotations to a graphical chart painted in such window. These annotations could include for example, data entered by the user manually from a keyboard/mouse 115, additional data generated automatically by applet code 162 in response to a user command from such input device, or some other authorized and accessible data source for the applet. These modifications (including deletions, supplementations or embellishments) of the window image data are handled at step 245 until the user is finished and wants to do some other task (i.e., saving the modified image data, or perhaps working with another image). Again, with reference to FIG. 1, it is apparent that such additional data entered at step 240 can be passed through to applet 160 and processed by applet code 162 to update applet window data buffer 164. From there it is passed on to display buffer 121 before it is used to update display memory 120 and the users display 125. Nonetheless, even though the window image data has been updated to include the efforts of the user to include such extra user generated data, it is not easily "capturable," so as to help the user preserve their efforts because as it is stored it is not in a format that is understandable by browser program, and cannot be output by applet 160 to a storage device 130 because of the aforementioned security restrictions.

Returning to FIG. 2, the present invention permits a user to retain the results of their efforts, and capture their modifications to the initial data in the following manner. First, at step 250, the user is prompted to determine if they would like to capture and preserve the modified window image data, i.e., such as by printing in hard copy form, or storing in some electronic form. If not, the user can retrieve a different file at step 230 or perform another operation of their choosing. Should the user desire to capture the updated window image, however, applet code 162 then proceeds at step 255 to convert such window image data into modified window data, which is stored in location 166 (FIG. 1). First, the window image data is captured using a built-in standard Java® programming tool known as pixelGrabber. This routine captures the pixels from the Java® image and renders them into a one-dimensional, array of integers. Each integer contains the red green and blue components of the color of that pixel. Then, this array is passed through a converter, where it is translated or converted into a standard graphics file format. This conversion is preferably performed by a pixel-to-gif converter to convert the pixels of the applet window image data into a Graphics Interchange Format (GIF) file. This conversion can be accomplished, for example, by a number of prior art programs, including by a freeware software routine authored by Jef Poskanzer entitled GifEncoder.java and available at any number of file sites on the Internet including at www.acme.com. It should be noted that the selection of the particular file format, and/or particular converter is not material to the present teachings, and the present invention is by no means restricted to any particular combination thereof. The only important parameter, as explained below, is that the modified applet window image data must be changed into a format that is compatible with browser program 150 as noted below. Alternatively, such format need only be readable by browser program 150 so that it can be downloaded and used by another program on the local computing system 102.

In any event, after such conversion, at step 260 modified window data 166 is then uploaded by applet 160 to remote server 180, where it can be written to remote data storage device 185 in a location 187 as a modified data file. This happens by opening a connection to a programming script running on web server 180 at the site the user is connected to. In the preferred embodiment, this is a script is implemented in "perl" which is a conventional, well-known scripting language commonly used by those skilled in the art. Basically, the perl script running on server 180 merely fetches the next available image number and writes the data from modified window data file 166 (containing the compressed array) to it, with a designation such as chartxxx.gif, where xxx is the next available number available on server 180. Because this file is in compressed format, the transfer time between local computing system 102 and remote server 180 should be relatively reasonable. Furthermore, it is expected that improvements in high speed internet access will likely obviate any concerns about such types of relatively small scale data transfers.

At this point the captured user modified image data is now located on a server which can be accessed by browser program 150. The perl script on server 180, therefore, replies to applet 160 at step 265 with a URL indicating the location of the new file, such as "www.prophetcharts.com/graphs/chartXXX.gif" and applet 160 then opens a new browser window, which can be displayed to the user on display 125, which points to that image file. Because such file is also retrieved in a format usable by browser 150, it can be manipulated and treated like any other file so that, for example, at step 270 it can now be saved in electronic form on local storage device 130, or printed on a local output device 135. The user can then proceed to retrieve additional data files at step 230, or as noted above, simply go on to another operation.

As a housekeeping matter, and to save storage space, any such additional files stored on server 180 can be deleted after the user's session is over. It can be seen from the above description, therefore, that a server 180 is configured to permit a user remote from such server to engage in an interactive on-line session with such server using the aforementioned applet 160. In this way, server 180 can interact and exchange data with local computing system 102 as described above, and preserve any contributions made during such session for the users benefit.

While the above process appears somewhat circuitous, applicants have confirmed that it in fact proceeds very rapidly, and from the perspective of the user, does not involve an inordinate delay. Furthermore this process retains the integrity of the intended framework for Java® applets by ensuring that they do not access local resources. In this manner, users are guaranteed that the applets are kept in the Java® "sandbox," and not permitted to perform operations that might compromise the users privacy or security. The present invention is extremely useful, therefore, for preserving and capturing the users edits, modification, supplementations of an applet window's image data during an interactive session with a remote server, which, absent the present teachings, would be otherwise lost resulting in reduced productivity, utility, user satisfaction, etc. It is expected that the present teachings can be used in any number of Java® applet based programs, therefore, where it is desirable to permit the user to interact with applet data and yet still permit the user to exploit the use of local resources without the restrictions normally imposed on applet code. The present invention opens up a new realm of possibilities for WWW programmers, web-site operators, on-line vendors and users of the WWW since it now allows data to be freely transferred and then modified under the users control in a manner that preserves the users contributions.

Figure 3A:
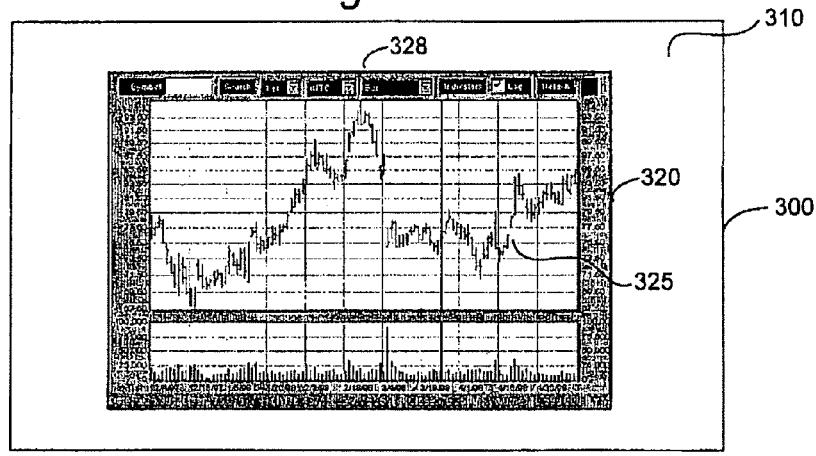
FIGS. 3A to 3C illustrates the output generated by the present system and method as such would be seen on a display device by a user of such system.
Figure 3B:
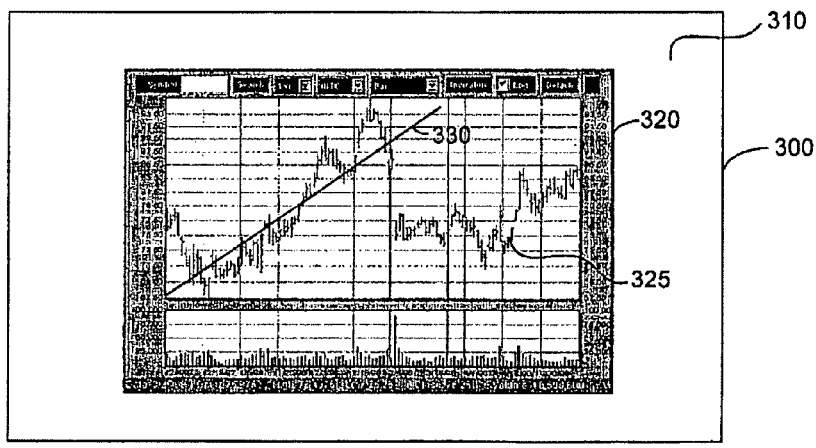
Figure 3C:
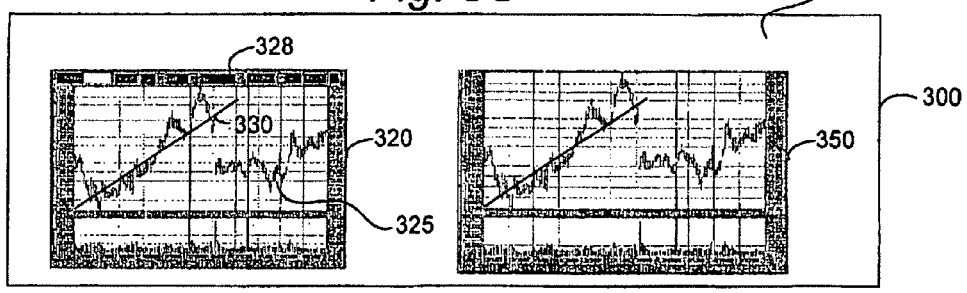

FIGS. 3A to 3C are a series of screen shots illustrating the operation of the present invention as perceived by a user of a remote program which is used to launch locally running applets on the user's local computing system. In FIG. 3A, a display 300 presents a user with a graphical interface 310 (generated by underlying browser 150) and an applet generated window image 320, which window contains applet window image data 325 (derived from initial data file 165) as well as command buttons/activators 328 at the top of window 320. The latter are used, as explained above, to permit a user to interact with the image presented in window 320, so that, as seen in FIG. 3B, such user can add additional information to such window data, remove information from the window, modify the existing data, etc. In this instance, the user has added a trend line 330 notation to the chart data image to reflect some additional perception by such user about such data that is not represented in the original data file 166; for example, an indicator showing the general trend of a stock price over time. Other image data annotations are of course possible, including descriptive labels, applet generated calculations, etc. A second data file containing data for a second stock could be subsequently loaded, for example, so that a composite image having data from both the first and second stocks could be seen in window 320.

Assuming the user desires to capture the image data including the added trend line 330, the conversion steps described above beginning with step 255 (FIG. 2) are then performed as noted. Looking at FIG. 3C, the returned modified data file 166 is then displayed in a graphics image format in a separate window 350 where, as noted earlier, it can be printed, saved, etc. by the user.

As alluded to briefly above, in another variation of the present invention, applet 160 can also permit such user to import an additional data file 166' from server 180, for example, representing data for a different stock so that a combined data image utilizing data from two different files 166 and 166' can be observed simultaneously in an overlay fashion and manipulated by the user. Such data from the different files can be represented in different colors in applet data image window 320 to help the user differentiate the behavior of the two superimposed data sets for the selected two stocks. Such combined data from the two files (or more if desired) can then be converted into a suitable file format as explained above for the single image case, and then handled subsequently in the same manner.

In yet another embodiment, the modified data file can include information other than graphics data. For example, the user can download a standard audio file from the remote server, edit such audio file using any conventional audio file editor, and then save any modifications in the same manner as performed above for the image data. Then, instead of receiving back a GIF file, a WAV file, MIDI file, etc., could be returned by the server. Standard encoders for compressing audio information can be used for generating the modified file at the local computing system before sending on this file to the server for later retrieval. Similar editing sessions with other types of files retrieved during an on-line session and manipulated by the user could be captured as well. In this manner, a user's contributions associated with an audio file, a text file, a video file, or any kind of multimedia file can be preserved and stored on the local computing system, even when using restricted code such as Java applets.

Although the present invention has been described in terms of a preferred embodiment, it will be apparent to those skilled in the art that many alterations and modifications may be made to such embodiments without departing from the teachings of the present invention. Accordingly, it is intended that the all such alterations and modifications be included within the scope and spirit of the invention as defined by the following claims.

What is claimed is:

1. A method comprising:
retrieving a multimedia file including chart data from a remote server system using a Java-based applet executing within a browser program on a local system,
wherein the Java-based applet has access to the remote server system, and
wherein the Java-based applet is restricted from accessing file systems on the local system to store a file on the local system;
presenting the multimedia file including the chart data under control of the Java-based applet in a display window on the local system for viewing by a user;
receiving, from the user, at the local system, annotation data under control of the Java-based applet;
transmitting at least the annotation data to the remote server system in response to the user requesting saving, on the local system, a modification of the chart data by the annotation data;
converting the annotation data and the multimedia file including the chart data into a modified multimedia file at the remote server system, the modified multimedia file being accessible to the Java-based applet; and
opening the modified multimedia file using the Java-based applet and browser program so that the modified multimedia file can be stored or outputted using the local system.

2. The method of claim 1, further comprising compressing the annotation data before the transmitting at least the annotation data to the remote server system.

3. The method of claim 2, wherein the compressing comprises converting the annotation data into a graphics format.

4. The method of claim 1, wherein the annotation data is specified by the user to modify the chart data.

5. The method of claim 1, wherein the chart data comprises historical stock prices for at least one security.

6. The method of claim 1, wherein the annotation data is captured within a window display buffer of the local system.

7. The method of claim 1, further comprising executing a script program at the remote server system to convert and store the modified file.

8. The method of claim 1, wherein the opening includes opening the modified file with a second display window separate from the display window.

9. The method of claim 1, wherein the Java-based applet is initially restricted from outputting the annotation data to the local system.

10. The method of claim 1, wherein the annotation data is specified by the user interacting with the chart data in the display window.

11. The method of claim 1, wherein the annotation data comprises at least one of trend lines, descriptive labels, or calculations.

12. A non-transitory computer readable medium having computer-executable instructions stored thereon that, if executed by a computing device, cause the computing device to perform operations comprising:
retrieving a multimedia file from a remote computer using an applet-based program on a local computer,
wherein the Java-based applet has access to the remote computer, and
wherein the applet-based program being restricted from accessing file systems on the local computer to store the file on the local computer;
presenting the multimedia file under control of the applet-based program in a display window on the local computer for viewing by a user;
receiving, from the user, at the local computer, annotation data under control of the applet-based program;
transmitting at least the annotation data to the remote computer in response to the user requesting saving, on the local computer, a modification of the chart data by the annotation data;
converting the annotation data and the multimedia file into a modified multimedia file at the remote computer, the modified multimedia file being accessible to the applet-based program; and opening the modified multimedia file using the applet-based program and browser program so that the modified multimedia file can be stored or outputted using the local computer.

13. The non-transitory computer readable medium of claim 12, further comprising compressing the annotation data before the transmitting at least the annotation data to the remote computer.

14. The non-transitory computer readable medium of claim 13, wherein the compressing comprises converting the annotation data into a graphics format.

15. The non-transitory computer readable medium of claim 12, wherein the annotation data is specified by the user to modify the file.

16. The non-transitory computer readable medium of claim 12, wherein the file comprises historical stock prices for at least one security.

17. The non-transitory computer readable medium of claim 12, wherein the annotation data is captured within a window display buffer of the local computer.

18. The non-transitory computer readable medium of claim 12, wherein the operations further comprise executing a script program at the remote computer to convert and store the modified file.

19. The non-transitory computer readable medium of claim 12, wherein the opening the modified file comprises opening the modified file with a second display window separate from the display window.

20. The non-transitory computer readable medium of claim 12, wherein the annotation data is specified by the user interacting with the file in the display window.

21. The non-transitory computer readable medium of claim 12, wherein the annotation data comprises at least one of trend lines, descriptive labels, or calculations.

* * * * *